(12) United States Patent
Berglund

(10) Patent No.: US 6,230,921 B1
(45) Date of Patent: May 15, 2001

(54) CLOSURE SYSTEM FOR A PRESSURE VESSEL

(75) Inventor: David N. Berglund, Cambridge, MA (US)

(73) Assignee: Sail Star Limited, Causeway Bay (HK)

( * ) Notice: Subject to any disclaimer, the term of this patent is extended or adjusted under 35 U.S.C. 154(b) by 0 days.

(21) Appl. No.: 09/542,164

(22) Filed: Apr. 4, 2000

Related U.S. Application Data

(60) Provisional application No. 60/152,888, filed on Sep. 8, 1999.

(51) Int. Cl.[7] .................................................. B65D 45/32
(52) U.S. Cl. .......................... 220/319; 220/582; 220/298; 220/316
(58) Field of Search .................................. 220/582, 319, 220/316, 324, 288, 298, 296, 293, 602, 377

(56) References Cited

U.S. PATENT DOCUMENTS

| | | | |
|---|---|---|---|
| 1,748,491 | * | 2/1930 | May . |
| 1,811,294 | * | 6/1931 | Bauroth . |
| 2,147,246 | * | 2/1939 | Dahl . |
| 2,601,936 | * | 7/1952 | Harris . |
| 2,748,975 | * | 6/1956 | Jacobson . |
| 3,136,007 | * | 6/1964 | Maher et al. . |
| 4,247,015 | | 1/1981 | Straub ................................. 220/328 |
| 4,257,394 | * | 3/1981 | Zabel ................................. 126/374 |
| 4,489,850 | | 12/1984 | Reneau ............................... 220/323 |
| 5,711,450 | | 1/1998 | Reneau ............................... 220/319 |
| 5,839,357 | * | 11/1998 | Ha et al. ............................ 99/337 |
| 5,943,721 | | 8/1999 | Lerette et al. ........................ 8/158 |
| 6,088,863 | | 7/2000 | McClain ............................. 8/159 |

* cited by examiner

Primary Examiner—Stephen Castellano
(74) Attorney, Agent, or Firm—Weingarten, Schurgin, Gagnebin & Hayes LLP

(57) ABSTRACT

A closure system which provides a lubricated lock ring on a hinged door assembly rather than proximate a pressure vessel is provided. The configuration of this system removes lubricants from the region immediately adjacent a pressure vessel entrance to be sealed by the door assembly. A shorter entrance tunnel for access to the pressure vessel interior is also provided by this configuration. A clamp ring having radially extending lugs is rigidly affixed proximate to and partially defining the pressure vessel entrance. The door has a continuous thread about an outer circumferential surface thereof. A lock ring having a complementary interior continuous thread is in rotational communication with the threaded circumferential surface of the door. The lock ring also has plural, inwardly projecting lugs which are capable of passing between the clamp ring lugs when the door is swung toward the clamp ring. The lock ring is capable of being rotated by a rotary actuator for engagement of the clamp ring lugs with the lock ring lugs. The door may be provided with a sight glass and light source for viewing the interior of the pressure vessel. The door may also be provided with a face plate on the door for maintaining the lock ring in concentric alignment with the door to prevent the cooperating threads from binding. Limit switches may be employed to detect when clamp ring and lock ring lugs are aligned for door closure, and when the lock ring is rotated by the desired amount. A proximity sensor may be provided for making sure the door is in a closed position before enabling lock ring rotation.

15 Claims, 8 Drawing Sheets

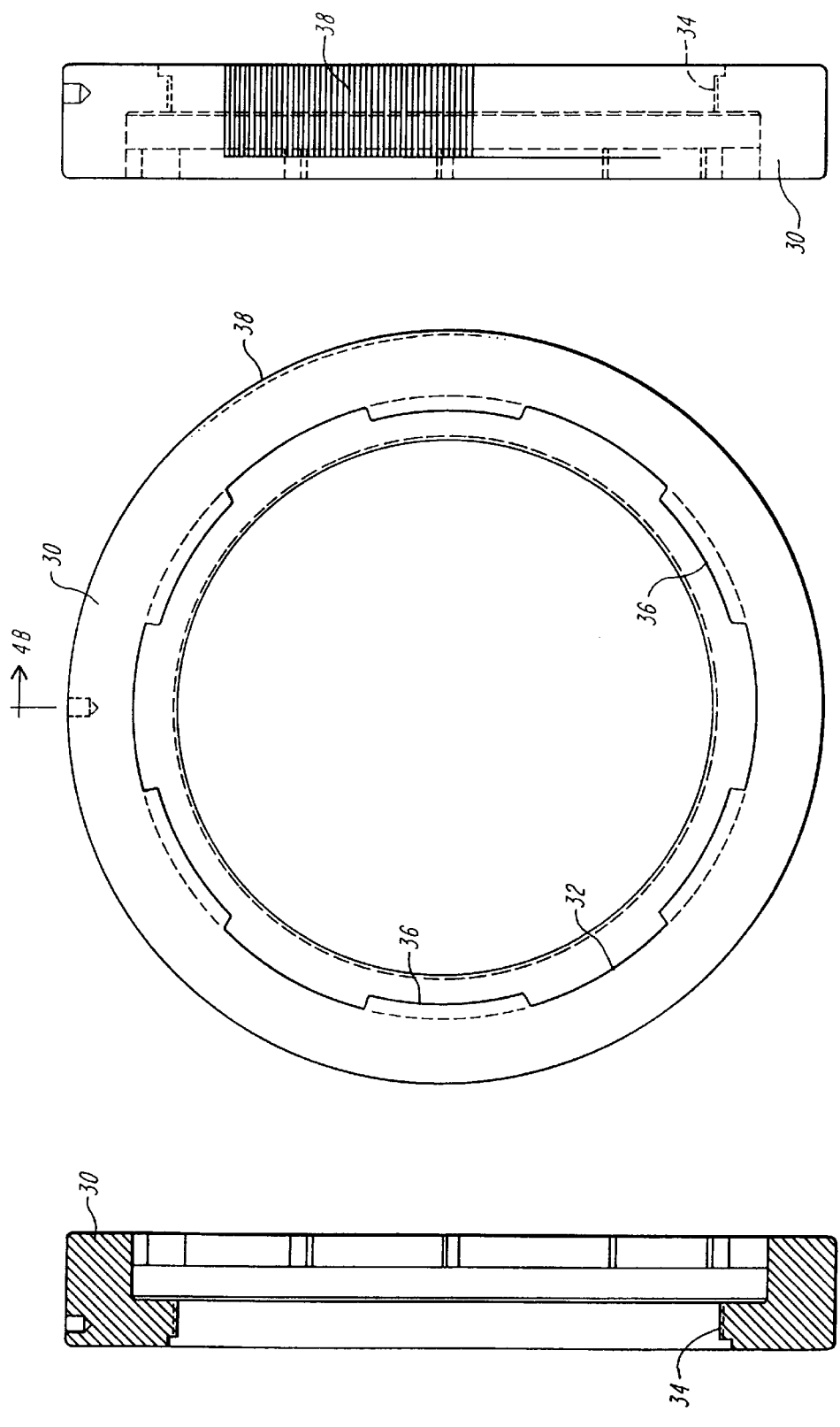

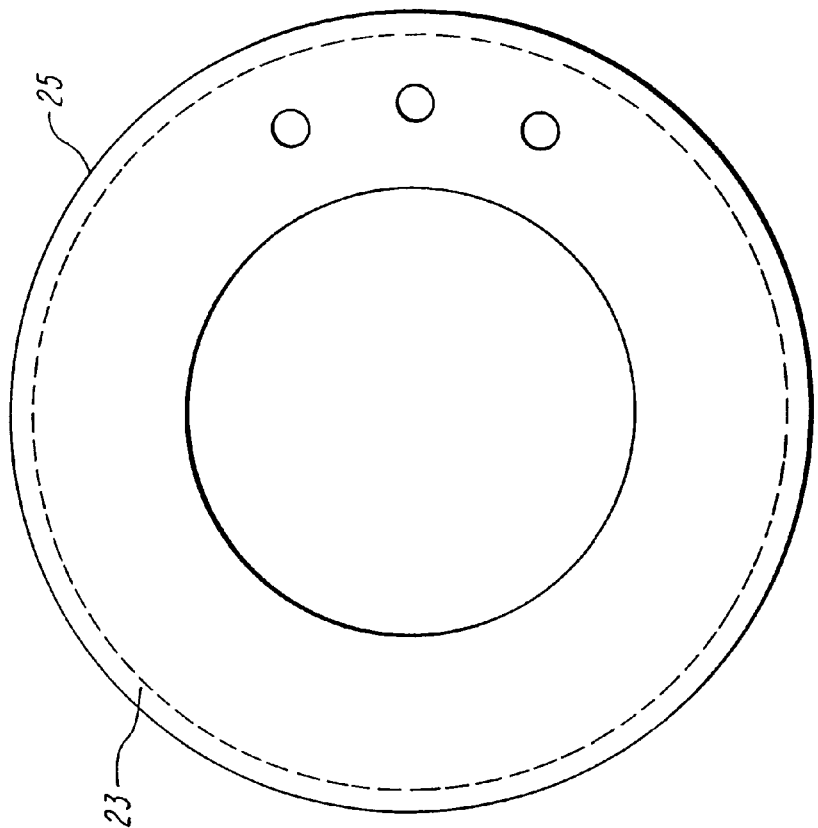
FIG.6A
FIG.6B

CLOSURE SYSTEM FOR A PRESSURE VESSEL

CROSS REFERENCE TO RELATED APPLICATIONS

This application claims priority of U.S. Provisional Patent Application No. 60/152,888, filed Sep. 8, 1999.

STATEMENT REGARDING FEDERALLY SPONSORED RESEARCH OF DEVELOPMENT

N/A

BACKGROUND OF THE INVENTION

A pressure vessel requires a closure system which can withstand the pressure differential between the interior of the vessel during use and the external, atmospheric pressure. Such a pressure vessel may be employed as a cleaning vessel in a dry cleaning machine. For cleaning vessel applications, it is preferable to provide a door which does not pose the risk of contaminating the materials to be passed therethrough with foreign substances associated with the door. Specifically, in the dry cleaning machine context, it is important that lubricants necessary for the proper operation of the door not come into contact with the garments or other materials loaded into the machine. Such materials may be referred to generically as substrates.

In the prior art, the risk of lubricant contamination arises due to the provision of a rotatable lock ring, having greased lugs, mounted on the high-pressure cleaning vessel. When a door is swung open, the substrates to be cleaned or those already cleaned must be moved through an opening defined by the greased lock ring.

A further disadvantage associated with closures for prior art pressure vessels is that having the rotatable lock ring proximate the vessel results in a deeper entrance path into the interior of the pressure vessel. When the lock ring is disposed on the face of a dry cleaning machine, it adds significantly to the length of the entrance tunnel into the cleaning vessel. Consequently, it is difficult for an operator to reach into the pressure vessel to remove the substrates; in so doing, the operator's own clothing may be contaminated by the greased lock ring.

It would therefore be desirable to have a closure system for a pressure vessel such as a cleaning vessel of a dry cleaning machine which does not provide a risk of contamination to substrates passing through the closure system, and which offers a relatively short entrance tunnel into the associated cleaning vessel.

BRIEF SUMMARY OF THE INVENTION

The presently disclosed invention provides a closure system which avoids the detrimental aspects of the prior art by providing a lubricated lock ring on a hinged door assembly rather than proximate a pressure vessel. This removes the lubricants from the path of substrates passing through the closure system in dry cleaning applications, and results in a shorter entrance tunnel for access to the pressure vessel.

A clamp ring is rigidly affixed proximate to and partially defining an entrance to the pressure vessel. The clamp ring is provided as a substantially circular ring having plural lugs projecting radially therefrom about the circumference of the clamp ring.

A cooperating hinged door is mounted to mechanically cooperate with the clamp ring. The door is substantially symmetrical about a central axis and is provided with a continuous thread about an outer circumferential surface thereof. Disposed about the circumference of the door and in rotational communication with the threaded circumferential surface is a lock ring. The lock ring is a substantially symmetrical circular ring having a central axis of symmetry and an inner circular surface which is threaded for installation about the door continuous thread. Offset along the axis of symmetry of the lock ring are plural, inwardly projecting lugs which are capable of passing between the outwardly projecting lugs of the fixed clamp ring when the door is swung towards the clamp ring about the hinge. The outer circumference of the lock ring is also provided with gear teeth substantially parallel to the axis of symmetry of the lock ring. These gear teeth are capable of mechanical cooperation with a spur gear associated with a rotary actuator for rotation of the lock ring and engagement with the clamp ring.

The door is preferably provided with a face plate affixed to an outer surface thereof. The lock ring, disposed about the door, has a circular recess formed in an outer surface thereof such that the face plate outer diameter lies within a portion of the circular recess. The outer diameter of the face plate is capable of sliding against the inner diameter of the circular recess. In this way, the lock ring is maintained concentric with the door. Thus, the face plate serves several functions. First, the lock ring is maintained concentric with the door, obviating the need for tight tolerances in the door and lock ring threads. Maintaining the lock ring concentric with the door increases the level of safety of the door system by ensuring the applied pressure is evenly distributed about the clamp ring. Second, aesthetic benefits are enjoyed as the face plate obscures the mechanical interface between the door and lock ring threads. The third benefit relates to the prevention of grease seepage from the same mechanical interface.

The door may also be provided with a sight glass enabling an operator to view the interior of the cleaning vessel during use. To facilitate such viewing, the door assembly may be further provided with a light source. Alternatively, the pressure vessel itself may be provided with a light source.

Limit switches may be employed to detect when lugs in the clamp ring and lugs in the lock ring are aligned for cleaning vessel closure, and when the lock ring is rotated by the desired amount. A proximity sensor may be provided for making sure the door is in a closed position before enabling the hydraulics controlling the rotary actuator which turns a spur gear to rotate the lock ring.

By locating the lock ring in conjunction with the door, the opportunity for contaminating the substrates to be loaded into the cleaning vessel is eliminated. Easy access to the interior of the cleaning vessel is also facilitated by this physical arrangement.

BRIEF DESCRIPTION OF THE SEVERAL VIEWS OF THE DRAWING

The invention will be more fully understood by reference to the following description in conjunction with the accompanying drawings of which:

FIG. 4A is a plan view of a lock ring of the closure system of FIG. 1;

FIG. 4B is a side-section view of the lock ring of FIG. 4A;

FIG. 4C is a side view of the lock ring of FIG. 4A;

FIG. 6A is a plan view of a face plate of the closure system of FIG. 1;

FIG. 6B is a side view of the face plate of FIG. 6A;

DETAILED DESCRIPTION OF THE INVENTION

Figure 1:
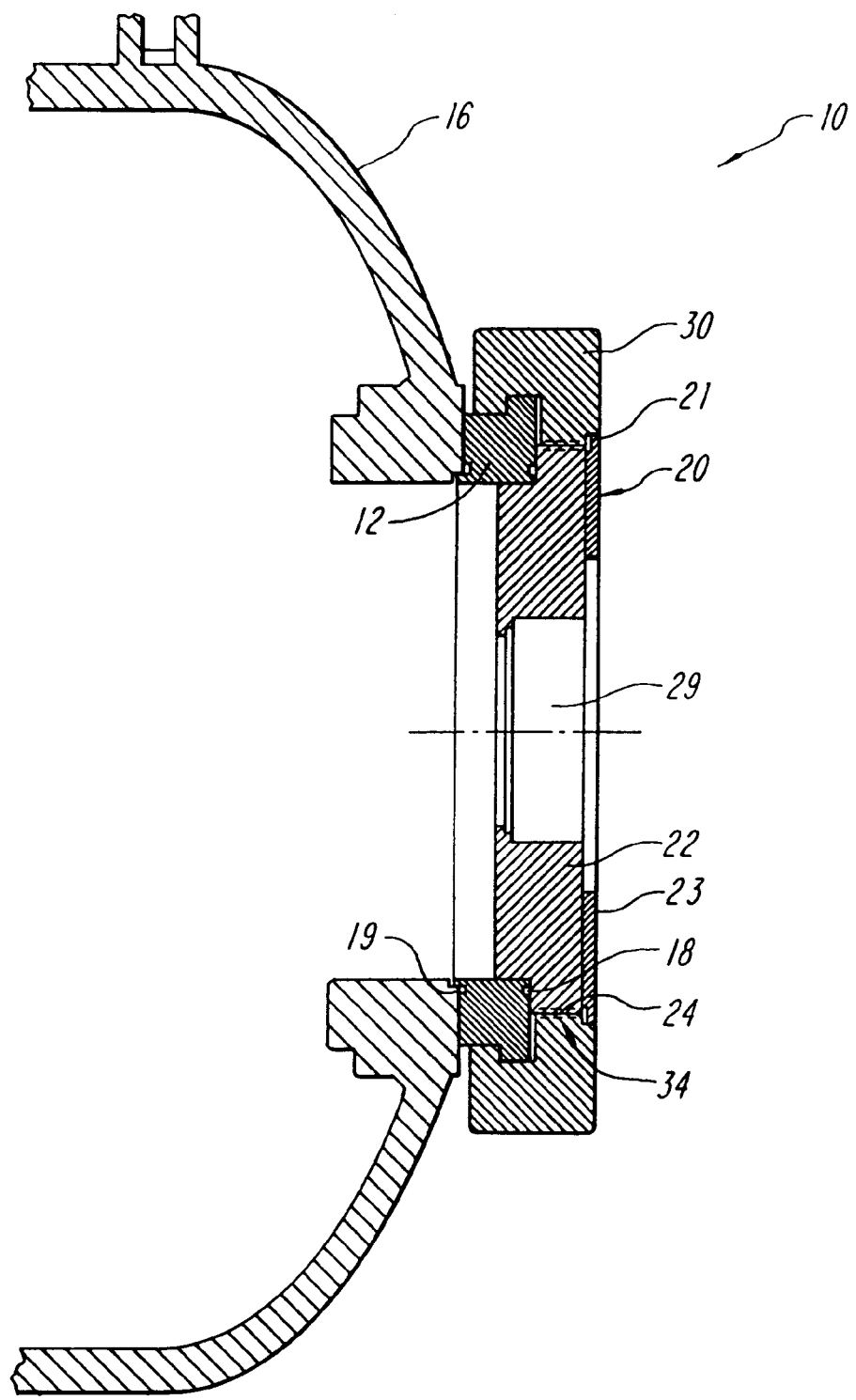
FIG. 1 is a side-section view of the closure system according to the present disclosure, shown in a closed position with respect to a pressure vessel.
Figure 2C:
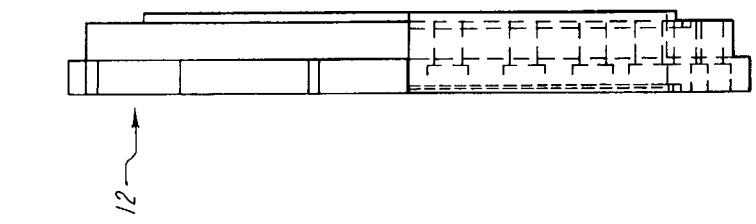
FIG. 2C is a partial side view of the clamp ring of FIG. 2A.
Figure 2A:
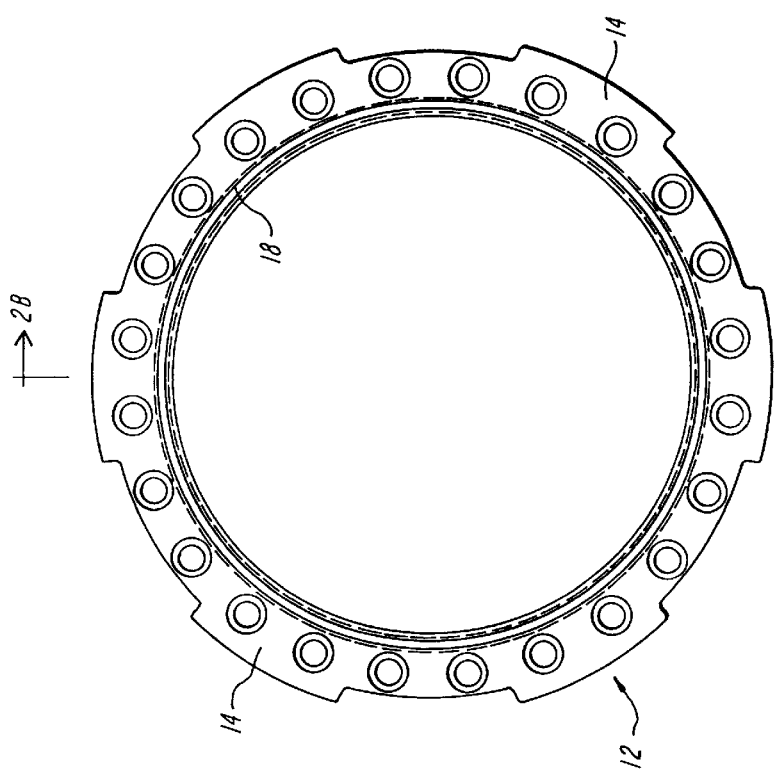
FIG. 2A is a plan view of a clamp ring of the closure system of FIG. 1.
Figure 2B:
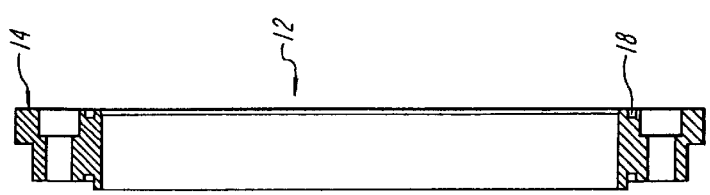
FIG. 2B is a side-section view of the clamp ring as shown in FIG. 2A.

As shown in FIGS. 1, 2A, 2B and 2C, the presently described closure system 10 includes a clamp ring 12 rigidly affixed proximate to and partially defining an entrance or port to a pressure vessel 16. The clamp ring 12 is provided as a substantially circular ring having plural lugs 14 projecting radially therefrom about the circumference of the clamp ring 12. One O-ring 18 is provided on an outer face of the clamp ring, opposite the pressure vessel. A second O-ring 19 is provided between the clamp ring 12 and the body of the pressure vessel 16. The O-rings 18, 19 may be fabricated of buna-N, as known to those skilled in the art.

Figure 3A:
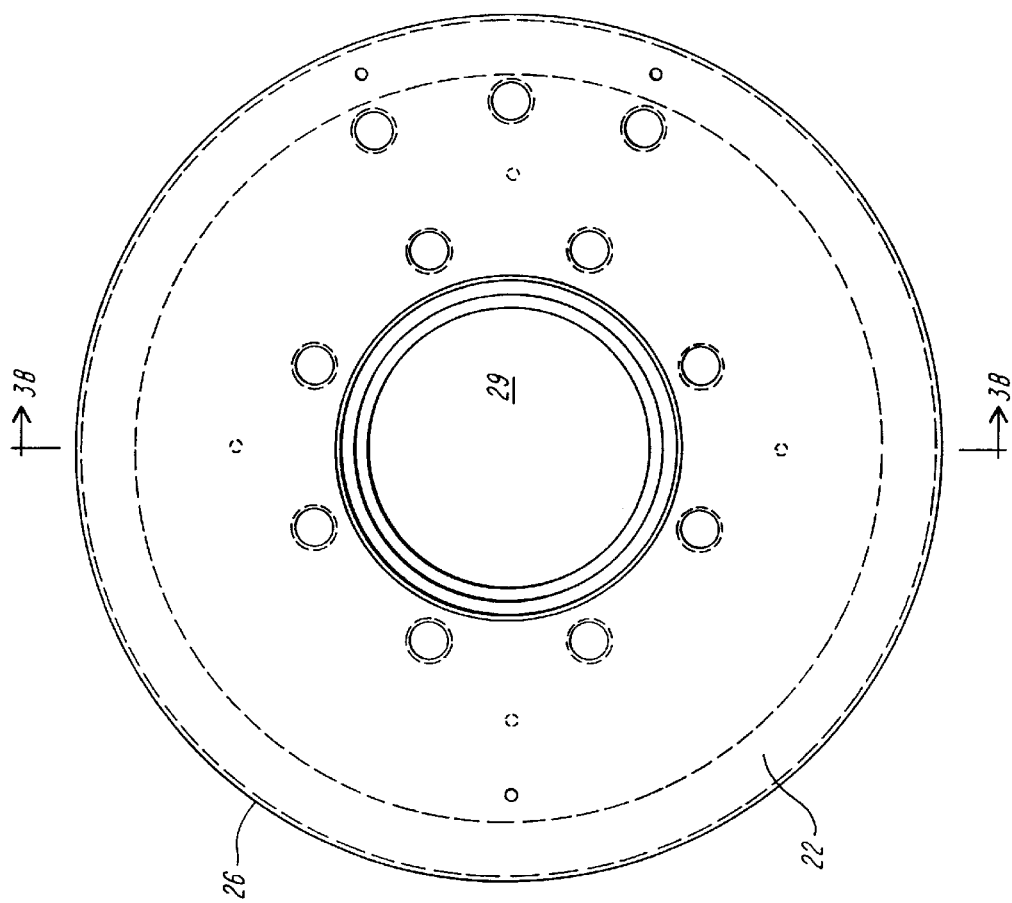
FIG. 3A is a plan view of a door portion of the closure system of FIG. 1.
Figure 3B:
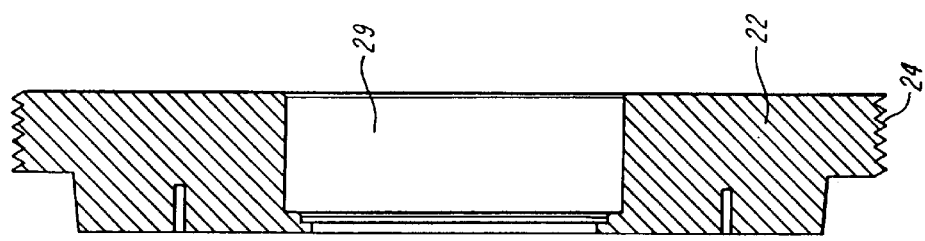
FIG. 3B is a side-section view of the door portion of FIG. 3A.

With reference to FIG. 1, a cooperating hinged door assembly 20 is comprised of a door portion 22, a face plate 23, and a hinged arm 40. The door portion 22 (FIGS. 3A and 3B) is substantially symmetrical about a central axis and is provided with a continuous thread 24 about an outer circumferential surface 26 thereof. In one embodiment, the continuous thread 24 is provided as double lead thread, three threads per inch.

Figure 5A:
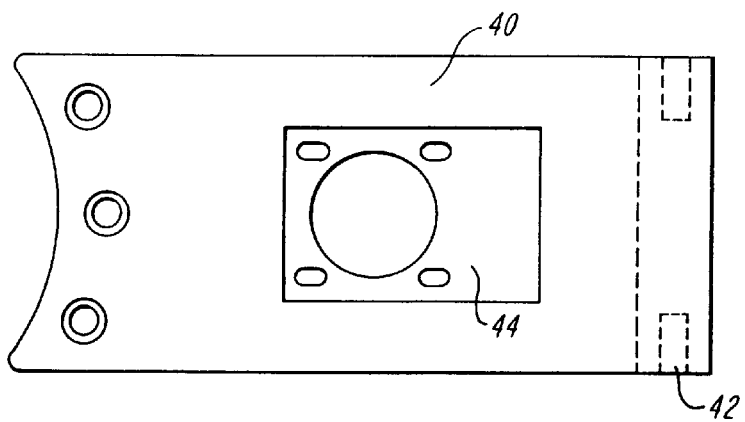
FIG. 5A is a plan view of a hinged arm of the closure system of FIG. 1.
Figure 5B:
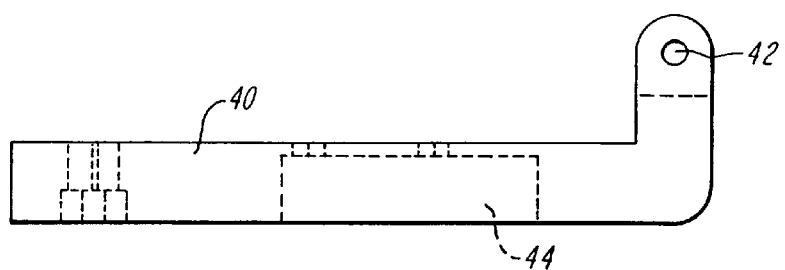
FIG. 5B is a top view of the hinged arm of FIG. 5A.
Figure 5C:
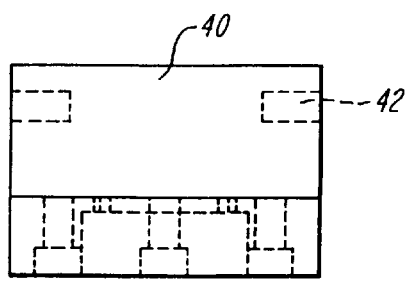
FIG. 5C is an end view of the hinged arm of FIG. 5A.

Disposed about the circumference of the door portion 22 and in rotational communication with the threaded circumferencial surface 24 of the door portion 22 is a lock ring 30, best viewed in FIGS. 1, 4A, 4B and 4C. The lock ring 30 is a substantially symmetrical circular ring having a central axis of symmetry and an inner circular surface 32 which is threaded 34 for installation about the door portion 22 continuous thread 24. Offset along the axis of symmetry of the lock ring 30 are plural, inwardly projecting lugs 36 which are capable of passing between the outwardly projecting lugs 14 of the fixed clamp ring 12 when the door assembly 20 is swung on a hinged arm 40 (FIGS. 5A, 5B and 5C) about a pivot point 42 towards the clamp ring 12.

The face plate 23, which is further illustrated in FIGS. 6A and 6B, is affixed to an exterior surface of the door portion 22 through the use of dowel pins, removable fasteners such as screws, or welding. The plate 23 facilitates keeping the lock ring 30 concentric with the door portion through sliding engagement between an outer circumferential surface 25 of the face plate 23 and an inner circular surface 35 of the lock ring 30. The face plate thus aids in keeping the lock ring centered about the door portion and prevents the threads on the outer circumferential surface 26 of the door portion 22 from binding with the threads on the inner circular surface 32 of the lock ring 30. Absent the face plate, the lock ring may rotate eccentrically, resulting in uneven contact areas about the door portion 22. Consequently, uneven surface pressure may exist on the cooperating lugs between the lock ring and the clamp ring. Mechanical failure may then result.

In order to encourage smooth rotation of the lock ring about the door portion, grease is used to lubricate the cooperating threads on these two elements. A bore (not shown) may be provided in the top of the lock ring for a removable, threaded lift ring. In one embodiment, a further threaded bore is provided in the bottom of the lift ring bore to receive a grease fitting. Thus, grease may be injected into the grease fitting, which provides a cooperating flow path to the threaded interface between the lock ring and the door portion.

Once so injected, the grease may accumulate in a grease pocket 21 provided between the face plate 23, the lock ring 30 and the door portion 22. Thus, a reservoir of lubricant is provided to avoid frictional wear between the cooperating threads. The face plate 23 functions to inhibit the flow of lubricant onto the front of the door portion.

An alternative embodiment of the presently disclosed closure system does not utilize a face plate. In this embodiment, it is necessary to provide tight tolerances in the threads on the door portion and the lock ring to inhibit lock ring displacement about the door portion. Further, this embodiment suffers from having the threaded interface between the door portion and the lock ring be exposed on the front surface of the door. This results in the possibility that lubricant may migrate onto the door and that the threads may be contaminated with dirt. An exposed threaded interface may also be considered less aesthetically appealing than the smooth, finished appearance of the door portion and face plate combination.

The outer circumference of the lock ring 30 is also provided with a region having gear teeth 38 which are substantially parallel to the axis of symmetry of the lock ring 30. These gear teeth 38 are capable of mechanical cooperation with a spur gear associated with a rotary actuator (not shown) installed within a cavity 44 in the hinged arm 40. In one embodiment, the spur gear has a three inch diameter. The rotary actuator is preferably a hydraulic rotary actuator having an associated hydraulic pump for pumping transmission fluid as the hydraulic medium. This rotary actuator can rotate 270 degrees, typically. Two hoses are provided in the hinged arm 40, one for conveying hydraulic fluid from a remote fluid supply and pump to the rotary actuator and another for conveying it away.

Controls for the rotary actuator may be located in a variety of locations, including on the door assembly, or, more preferably, on an enclosure disposed about the pressure vessel. Such controls may include a push-button actuator for locking the lock ring 30 about the clamp ring 12, another push-button for unlocking the lock ring 30, and various controls associated with the process to be carried out within the pressure vessel 16. Alternatively, the push-buttons may be replaced with a multi-position rotating lever or knob, or many other suitable control elements as known to those skilled in the art. A further control may be provided for activating a light source (not shown) disposed in conjunction with the door portion or the pressure vessel itself for viewing the interior of the pressure vessel 16 when the door portion is locked against the clamp ring 12. These controls are in electrical communication with respective devices via wires or cables routed within the hinged arm 40.

Figure 7C:
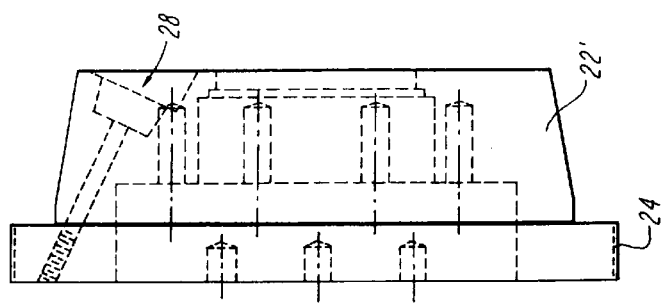
FIG. 7C is a side view of the alternative embodiment of the door portion of FIG. 7A.
Figure 7A:
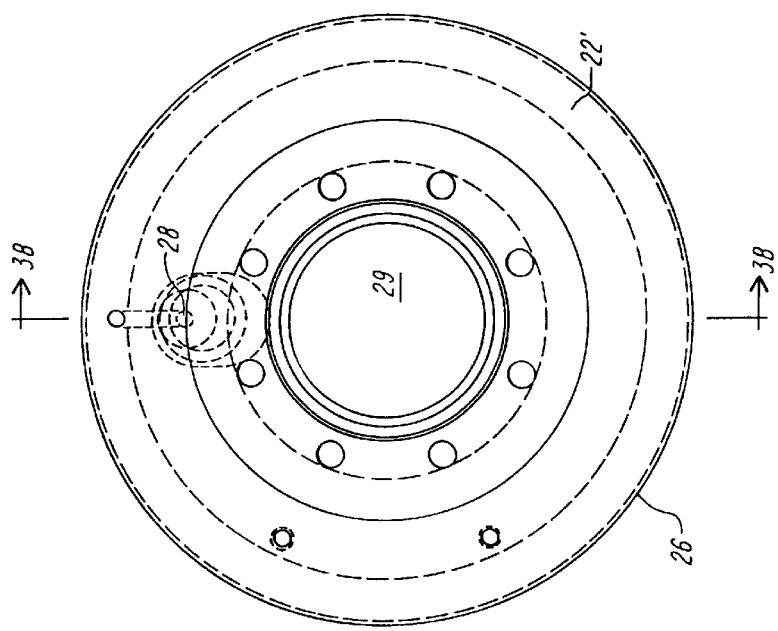
FIG. 7A is a plan view of an alternative embodiment of a door portion for use in the closure system of FIG. 1.
Figure 7B:
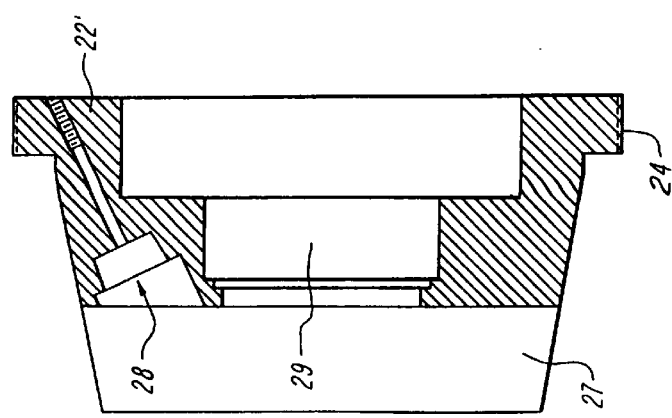
FIG. 7B is a side-section view of the alternative embodiment of the door portion of FIG. 7A.
Figure 8A:
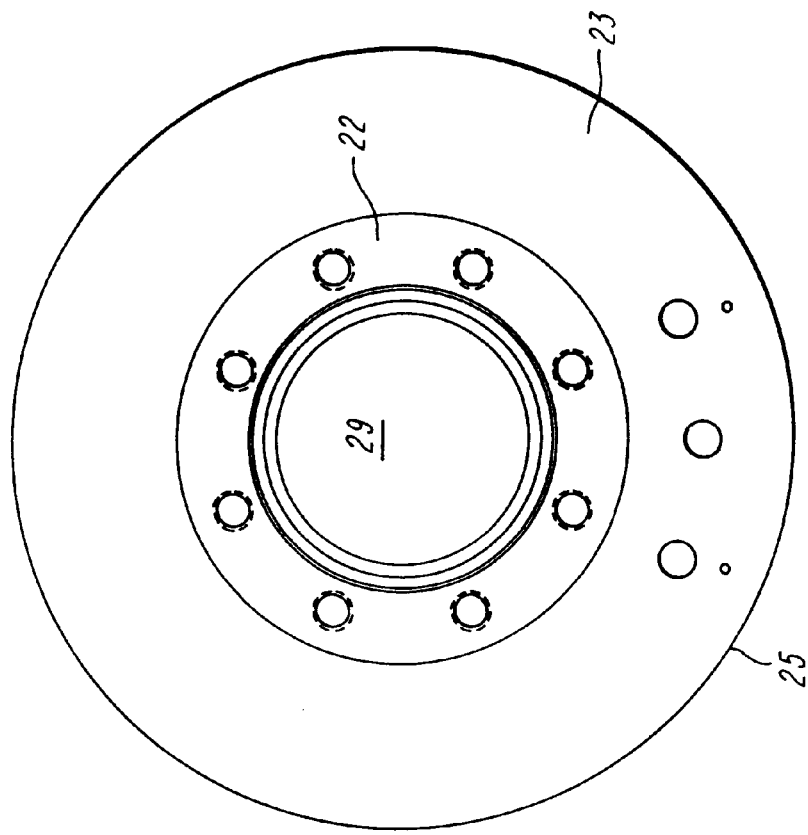
FIG. 8A is a plan view of the door portion of FIG. 3A with the face plate of FIG. 6A attached thereto.
Figure 8B:
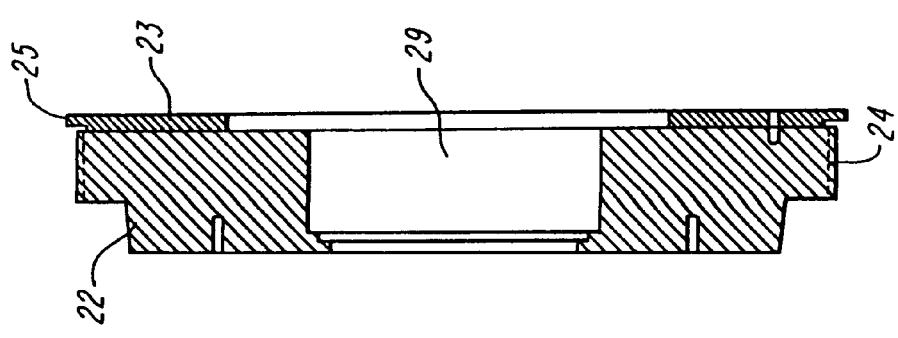
FIG. 8B is a side-section view of the combined door portion and face plate of FIG. 8A.

As discussed below, in order to facilitate the monitoring of the cleaning process within the cleaning vessel, illumination from a light source (not shown) is provided through an aperture 28 in a further embodiment of a door portion 22', as shown in FIGS. 7A, 7B, and 7C. The hinged arm 40 provides a fiber optic cable from a remote light source for illuminating the interior of the pressure vessel 16. Alternatively, electrical power may be provided by one or more conductive cables through the hinged arm 40 to a light source disposed in the door portion 22'.

When the rotary actuator is activated, the spur gear rotates, and, being in cooperation with the outer circumferential gear teeth 38 of the lock ring 30, the lock ring 30 rotates about the door portion 22 through sliding contact of the threaded inner circular surface 32, 34 of the lock ring 30 and the threaded outer circumferential surface 24, 26 of the door assembly 20. This rotation of the lock ring 30 locates at least a portion of the lock ring lugs 36 behind respective ones of the lugs 14 on the fixed clamp ring 12. The pitch of the cooperating threads 24, 34 on the door portion 22 and lock ring 30 draws the door assembly 20 into the clamp ring 12 and the associated O-ring 18 as the lock ring 30 is rotated. Preferably, the lock ring lugs 36 are substantially aligned with the clamp ring lugs 14 when the desired sealing force is applied between the door portion 22 and the clamp ring 12.

In a preferred embodiment, there are six lugs 14, 36 on each of the lock ring 30 and clamp ring 12. The pitch of the threads 24, 34 between the lock ring 30 and the door portion 22 is chosen such the door portion 22 is fully drawn against the outer face of the clamp ring 12 once the lock ring 30 has been rotated thirty degrees. In an alternative embodiment, a different number of lugs 14, 36 could be employed. For instance, twelve lugs 14, 36 could be used on both the clamp ring 12 and the lock ring 30, though this would require a steeper pitch to the threads 24, 34 between the door portion 22 and the lock ring 30 or more threads and leads. A steeper pitch may lead to the lock ring 30 backing off under pressure from within the pressure vessel 16.

The lock ring 30 is preferably provided as nickel plated carbon steel, and an outer portion of the door portion 22 is stainless steel. The clamp ring 12 is preferably stainless steel, as are the fasteners. Alternatively, titanium could be employed for various components. This material is lighter, though potentially more costly. The lubricant employed on the lock ring 30 is grease, known to those skilled in the art.

The door portion 22 may be provided with a sight glass 29 enabling an operator to view the interior of the cleaning vessel during use. The sight glass 29 may be provided of laminated PYREX or other suitable material. In an alternative embodiment, then door may be provided with a fused glass window for viewing the interior of the vessel. A fused glass window comprises a fused glass pane of a thickness sufficient to withstand the pressures developed within the pressure vessel. Surrounding the pane is a metal ring, such that the pane is held in place by compressive forces from the metal ring. The metal ring of the fused glass window may be interference fit, welded, or bolted onto the surrounding door portion 22. In yet a further embodiment, the door portion 22 itself may be formed from the fused glass window. The outer surface of the fused glass window metal ring is provided with the outer circumferential surface dual threads 24 necessary to interface to the inner threads 34 of the lock ring 30.

To facilitate viewing of the cleaning vessel interior, the door portion 22' may be further provided with a light source such as a halogen bulb disposed within an aperture 28 in the door portion 22'. The light source (not shown) may shine into the pressure vessel 16 by being installed directly in the aperture 28 of the door portion 22', or may be remotely located and optically coupled through the door portion 22' through the use of fiber optic materials.

The door portion 22' may be provided with a polypropylene filler 27 (FIG. 7B, not shown for simplicity in FIG. 1) to fill an entrance tunnel into the pressure vessel 16 when the door portion 22' is brought into contact with the clamp ring 12, thus providing a pressure vessel 16 interior surface which is more symmetric and is of lower volume. The door portion 22, 22' may also be provided with a handle (not shown) to facilitate the positioning of the door assembly 20.

Two limit switches (not shown) are preferably employed, one activated when the lugs 14 on the clamp ring 12 and the lugs 36 on the lock ring 30 are interleaved to enable door closure, and another activated when the lock ring 30 is rotated by the desired amount to substantially align the lugs 14, 36 in the locked position. The latter switch avoids the possibility of over-torquing the lock ring 30 and seizing the door portion 22 against the clamp ring 12 by causing the hydraulic pump to be turned off. Both switches are associated with the lock ring 30.

A proximity sensor (not shown) may also be provided for making sure the door assembly 20 is in a closed position against the clamp ring 12 before enabling the hydraulics controlling the lock ring 30. This avoids activation of the lock ring 30 when improperly aligned with the clamp ring 12. It also prevents rotation of the lock ring 30 when the door assembly 20 is open and when an operator's hands may be in the vicinity of the lock ring 30.

The lugs 14, 36 on the clamp ring 12 and lock ring 30 have flat mating surfaces preferably, though they could be tapered, which in a further embodiment would eliminate the need to provide pitched threads 24, 34 between the door portion 22, 22' and the lock ring 30. Tapered lugs 14, 36 are preferably realized by welding tapered wedges onto flat lugs. In either embodiment, the lugs 14, 36 are preferably welded onto the respective ring 12, 30.

These and other examples of the invention illustrated above are intended by way of example and the actual scope of the invention is to be limited solely by the scope and spirit of the following claims.

What is claimed is:

1. A closure system for a pressure vessel, comprising:
    a clamp ring affixed about an opening in said pressure vessel, said clamp ring having a plurality of outwardly projecting radial lugs; and
    a hinged door assembly, including:
        a pivot point affixed relative to said pressure vessel;
        a hinged arm disposed for rotation about said pivot point;
        a door portion affixed to said hinged arm and capable of being located adjacent said clamp ring; and
        a lock ring disposed in mechanical communication with respect to said door portion, said lock ring adapted for rotation about said door portion and having a plurality of inwardly projecting lugs.

2. The closure system of claim 1, wherein said lock ring and said clamp ring have an equal number of lugs.

3. The closure system of claim 2, wherein said lock ring lugs are dimensioned to pass between said clamp ring lugs when said lock ring lugs are in a first position relative to said door portion.

4. The closure system of claim 1, further comprising a resilient O-ring on an outer surface of said clamp ring or an inner surface of said door portion, wherein said clamp ring and said door portion abut said O-ring when said clamp ring and said door portion are brought into contact.

5. The closure system of claim 1, wherein said clamp ring comprises a resilient O-ring on an inner surface of said clamp ring, wherein said O-ring is compressed between said clamp ring and said pressure vessel.

6. The closure system of claim 1, wherein said door portion comprises an outer, circumferential continuous thread.

7. The closure system of claim 6, wherein said lock ring further comprises an inner, circumferential continuous thread adapted for sliding communication with said outer, circumferential continuous thread of said door portion.

8. The closure system of claim 1, wherein said hinged arm comprises a rotary actuator and gear system.

9. The closure system of claim 8, said lock ring comprises gear teeth adapted for mechanical communication with said rotary actuator and gear system, wherein activation of said rotary actuator and gear system results in rotation of said lock ring about said door portion.

10. The closure system of claim 6, wherein said continuous threads of said door portion and of said lock ring are oriented to result in said door portion being pulled towards the pressure vessel when said lock ring is rotated about said door portion such that said lock ring lugs are substantially aligned behind said clamp ring lugs.

11. The closure system of claim 1, wherein said door portion comprises a sight glass.

12. The closure system of claim 1, wherein said door portion comprises a light source for providing light into said pressure vessel when said door portion is in a closed position adjacent said pressure vessel.

13. The closure system of claim 12, wherein said light source comprises a light emitting element.

14. The closure system of claim 12, wherein said light source comprises a light conveying element.

15. The closure system of claim 1, further comprising a face plate disposed in conjunction with said door portion, said face plate having a circular outer surface adapted for sliding engagement with a circular inner surface of said lock ring, whereby said face plate is adapted for maintaining said lock ring in a substantially concentric relationship about said door portion.

* * * * *

UNITED STATES PATENT AND TRADEMARK OFFICE
CERTIFICATE OF CORRECTION

PATENT NO.    : 6,230,921 B1
DATED         : May 15, 2001
INVENTOR(S)   : David N. Berglund It is certified that error appears in the above-identified patent and that said Letters Patent is hereby corrected as shown below:

<u>Column 8,</u>
Line 6, "the" should read -- said --.

Signed and Sealed this

Twenty-sixth Day of November, 2002

Attest:

Attesting Officer

JAMES E. ROGAN
Director of the United States Patent and Trademark Office